(12) United States Patent
Kiribuchi et al.

(10) Patent No.: US 12,223,236 B2
(45) Date of Patent: Feb. 11, 2025

(54) INFORMATION PROCESSING APPARATUS, INFORMATION PROCESSING METHOD, AND NON-TRANSITORY COMPUTER READABLE MEDIUM

(71) Applicants: KABUSHIKI KAISHA TOSHIBA, Tokyo (JP); Kioxia Corporation, Tokyo (JP)

(72) Inventors: Daiki Kiribuchi, Ota (JP); Satoru Yokota, Yokohama (JP); Soh Koike, Tachikawa (JP); Tadayoshi Uechi, Kawasaki (JP)

(73) Assignees: KAISHA TOSHIBA, Tokyo (JP); Kioxia Corporation, Tokyo (JP)

( * ) Notice: Subject to any disclaimer, the term of this patent is extended or adjusted under 35 U.S.C. 154(b) by 911 days.

(21) Appl. No.: 17/193,546

(22) Filed: Mar. 5, 2021

(65) Prior Publication Data

US 2022/0067235 A1    Mar. 3, 2022

(30) Foreign Application Priority Data

Aug. 31, 2020    (JP) .................................. 2020-146089

(51) Int. Cl.
*G06F 30/20*        (2020.01)
*G06F 17/18*        (2006.01)
(Continued)

(52) U.S. Cl.
CPC .............. *G06F 30/20* (2020.01); *G06F 17/18* (2013.01); *G06N 7/01* (2023.01); *G06F 2111/10* (2020.01)

(58) Field of Classification Search
CPC ...... G06F 30/20; G06F 17/18; G06F 2111/10; G06N 7/01
See application file for complete search history.

(56) References Cited

U.S. PATENT DOCUMENTS 10,607,358 B2    3/2020  Kaneko
2019/0287010 A1*  9/2019  Imamura ................ G06N 20/00
(Continued)

FOREIGN PATENT DOCUMENTS

JP    2018-73360 A    5/2018
JP    2020-27370 A    2/2020
(Continued)

OTHER PUBLICATIONS

Li C, Gupta S, Rana S, Nguyen V, Venkatesh S, Shilton A. High dimensional Bayesian optimization using dropout. arXiv preprint arXiv:1802.05400. Feb. 15, 2018. (Year: 2017).*

(Continued)

*Primary Examiner* — Chuen-Meei Gan
(74) *Attorney, Agent, or Firm* — Oblon, McClelland, Maier & Neustadt, L.L.P.

(57) ABSTRACT

An information processing apparatus according to an embodiment of the present invention includes an estimator and a recommender. The estimator is configured to, based on a data set including a set value set for a parameter and an evaluation value or an evaluation value variation where the set value is set for the parameter, estimate a relationship between the set value and the evaluation value variation. The evaluation value variation indicates a variation of respective evaluation values where a plurality of values included within a neighborhood range that is based on the set value are set for the parameter. The recommender is configured to, based on the estimated relationship, determine a recommended set value.

12 Claims, 10 Drawing Sheets

(51) Int. Cl.
*G06N 7/01* (2023.01)
*G06F 111/10* (2020.01)

(56) References Cited

U.S. PATENT DOCUMENTS

| | | |
|---|---|---|
| 2020/0050717 A1 | 2/2020 | Kiribuchi et al. |
| 2021/0248293 A1 | 8/2021 | Yokota et al. |
| 2022/0245919 A1* | 8/2022 | Sano .................... G06V 10/765 |

FOREIGN PATENT DOCUMENTS

| | | |
|---|---|---|
| JP | 2021-125136 A | 8/2021 |
| WO | WO 2017/047309 A1 | 3/2017 |

OTHER PUBLICATIONS

Uhrenholt AK, Jensen BS. Efficient Bayesian optimization for target vector estimation. Inthe 22nd International Conference on Artificial Intelligence and Statistics Apr. 11, 2019 (pp. 2661-2670). PMLR. (Year: 2019).*

U.S. Appl. No. 17/014,759, filed Sep. 8, 2020, Satoru Yokota, et al.

* cited by examiner

| PARAMETER | LOWER LIMIT | UPPER LIMIT |
|---|---|---|
| $X_1$ | 10 | 100 |
| $X_2$ | 0.5 | 15 |
| ... | ... | ... |
| $X_{10}$ | 20 | 500 |

FIG. 4

| PARAMETER | TYPE | NEIGHBORHOOD LOWER LIMIT | NEIGHBORHOOD UPPER LIMIT |
|---|---|---|---|
| $X_1$ | ADDITIVE | −5 | +5 |
| $X_2$ | MULTIPLICATIVE | −10% | +10% |
| ... | ... | ... | ... |
| $X_{10}$ | ADDITIVE | −5 | +10 |

FIG. 5

| PARAMETER | | | | EVALUATION |
|---|---|---|---|---|
| $X_1$ | $X_2$ | ... | $X_{10}$ | Y |
| 35 | 2.7 | ... | 140 | 0.88 |
| 78 | 13 | ... | 489 | 0.64 |
| ... | ... | ... | ... | ... |
| 24 | 8.4 | ... | 77 | 0.92 |

FIG. 6

INFORMATION PROCESSING APPARATUS, INFORMATION PROCESSING METHOD, AND NON-TRANSITORY COMPUTER READABLE MEDIUM

CROSS-REFERENCE TO RELATED APPLICATION (S)

This application is based upon and claims the benefit of priority from Japanese Patent Application No. 2020-146089, filed Aug. 31, 2020; the entire contents of which are incorporated herein by reference.

FIELD

Embodiments described herein relate generally to an information processing apparatus, an information processing method, and non-transitory computer readable medium.

BACKGROUND

There has been a demand for a technique that automatically adjusts a set value for a parameter used in a simulation or a test with fewer trials. As the technique, for example, Bayesian optimization, which enables efficient adjustment of a value of a parameter, has been known.

However, where a system in operation is adjusted or a product is manufactured using a set value regarded as optimum, a setting may slightly deviate from the set value regarded as optimum because of various factors. There has also been a demand to avoid substantial effect of the deviation in such cases.

BRIEF DESCRIPTION OF THE DRAWINGS

FIG. 4 is a diagram illustrating an example of data relating to set ranges;

FIG. 5 is a diagram illustrating an example of data relating to neighborhood ranges;

FIG. 6 is a diagram illustrating an example of a data set;

DETAILED DESCRIPTION

An embodiment of the present invention provides, e.g., an apparatus that recommends a set value for a parameter, the set value causing less effect even if the set value deviates from an assumed value, as an optimum value.

An information processing apparatus according to an embodiment of the present invention includes an estimator and a recommender. The estimator is configured to, based on a data set including a set value set for a parameter and an evaluation value or an evaluation value variation where the set value is set for the parameter, estimate a relationship between the set value and the evaluation value variation. The evaluation value variation indicates a variation of respective evaluation values where a plurality of values included within a neighborhood range that is based on the set value are set for the parameter. The recommender is configured to, based on the estimated relationship, determine a recommended set value.

Below, a description is given of embodiments of the present invention with reference to the drawings. The present invention is not limited to the embodiments.

First Embodiment

Figure 1:
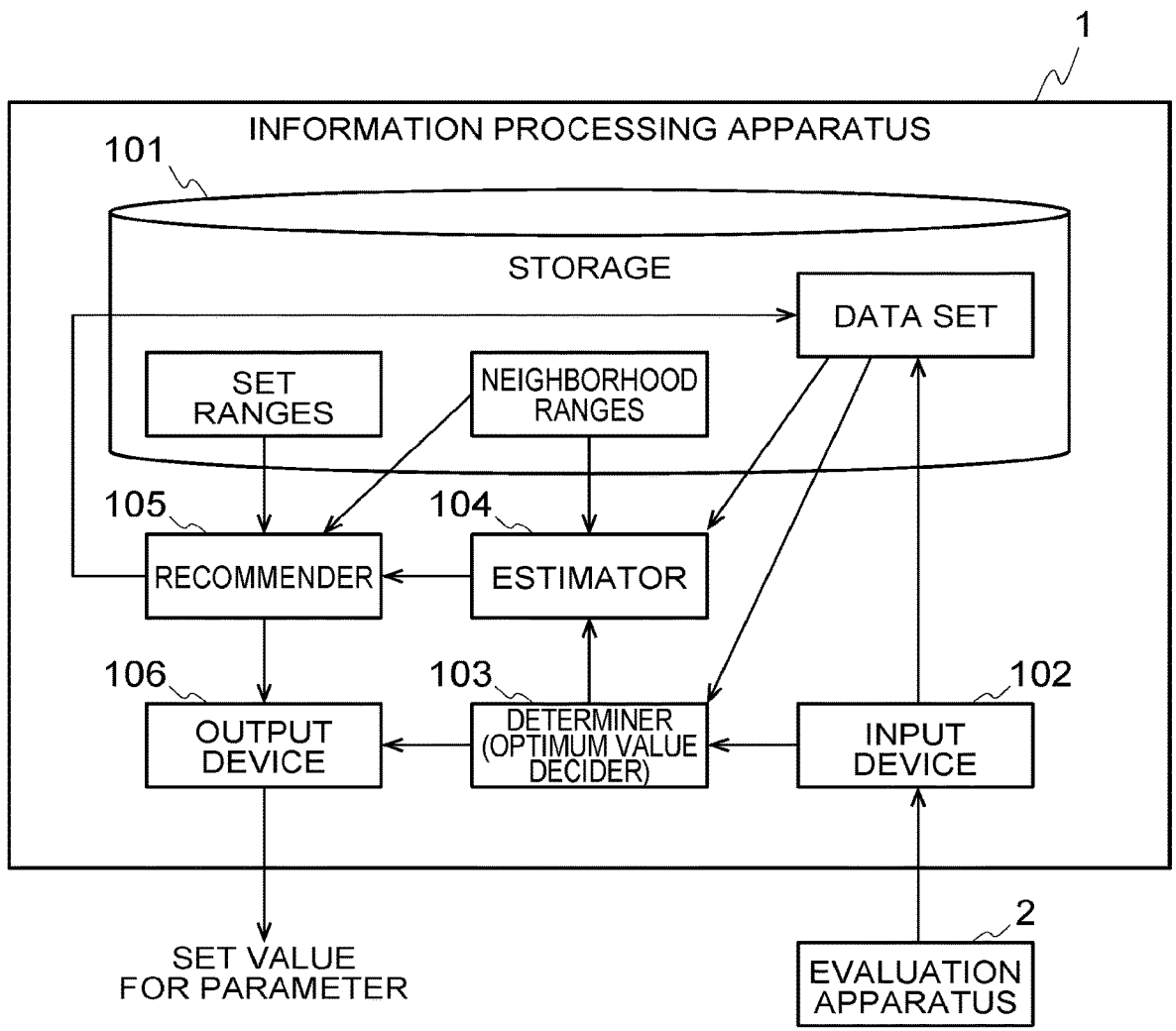
FIG. 1 is a block diagram illustrating an example of an information processing system according to a first embodiment.

FIG. 1 is a block diagram illustrating an example of an information processing system according to a first embodiment. The information processing system according to the present embodiment includes an information processing apparatus 1 and an evaluation apparatus 2. The information processing apparatus 1 includes storage 101, an input device 102, a determiner (optimum value decider) 103, an estimator 104, a recommender 105 and an output device 106.

The information processing apparatus 1 recommends a set value for a parameter used in a simulation or a test. For example, in a simulation, a simulation model including a parameter is used and a value set for the parameter of the model, that is, a set value is recommended. Also, for example, an amount of sample used in a test may be regarded as a parameter and a value of the amount may be recommended. Note that in the below, unless specifically stated otherwise, the term "test" includes a simulation.

The evaluation apparatus 2 performs evaluation of a result of a test based on the recommended set value and generates information relating to the evaluation. The information includes, e.g., an evaluation value and/or an evaluation value variation, which will be described later. Note that the evaluation apparatus 2 may perform a simulation based on the recommended set value and generate information relating to evaluation of the simulation. Alternatively, the evaluation apparatus 2 may generate information relating to evaluation of a test that is based on the recommended set value by a user performing the test and inputting a result of the test to the evaluation apparatus 2.

Also, the information processing apparatus 1 acquires the information relating to evaluation of the result of the test that is based on the recommended set value from the evaluation apparatus 2, and re-recommends a set value based on the information. In other words, the information processing apparatus 1 recommends a set value to be used in a next test. In this way, the information processing apparatus 1 obtains an optimum set value by repetition of recommendation of a set value. In other words, the information processing apparatus 1 estimates an optimum value of the parameter.

In the present description, "optimum value" is a value regarded as optimum by the information processing apparatus 1 irrespective of whether or not the value is actually optimum. Also, a plurality of values may be determined as optimum. In other words, a plurality of values may be output as optimum values. Also, the number of parameters for which an optimum set value is obtained (also referred to as "number of items of a model" or "number of dimensions of a model") may be one or two or more.

Figure 2:
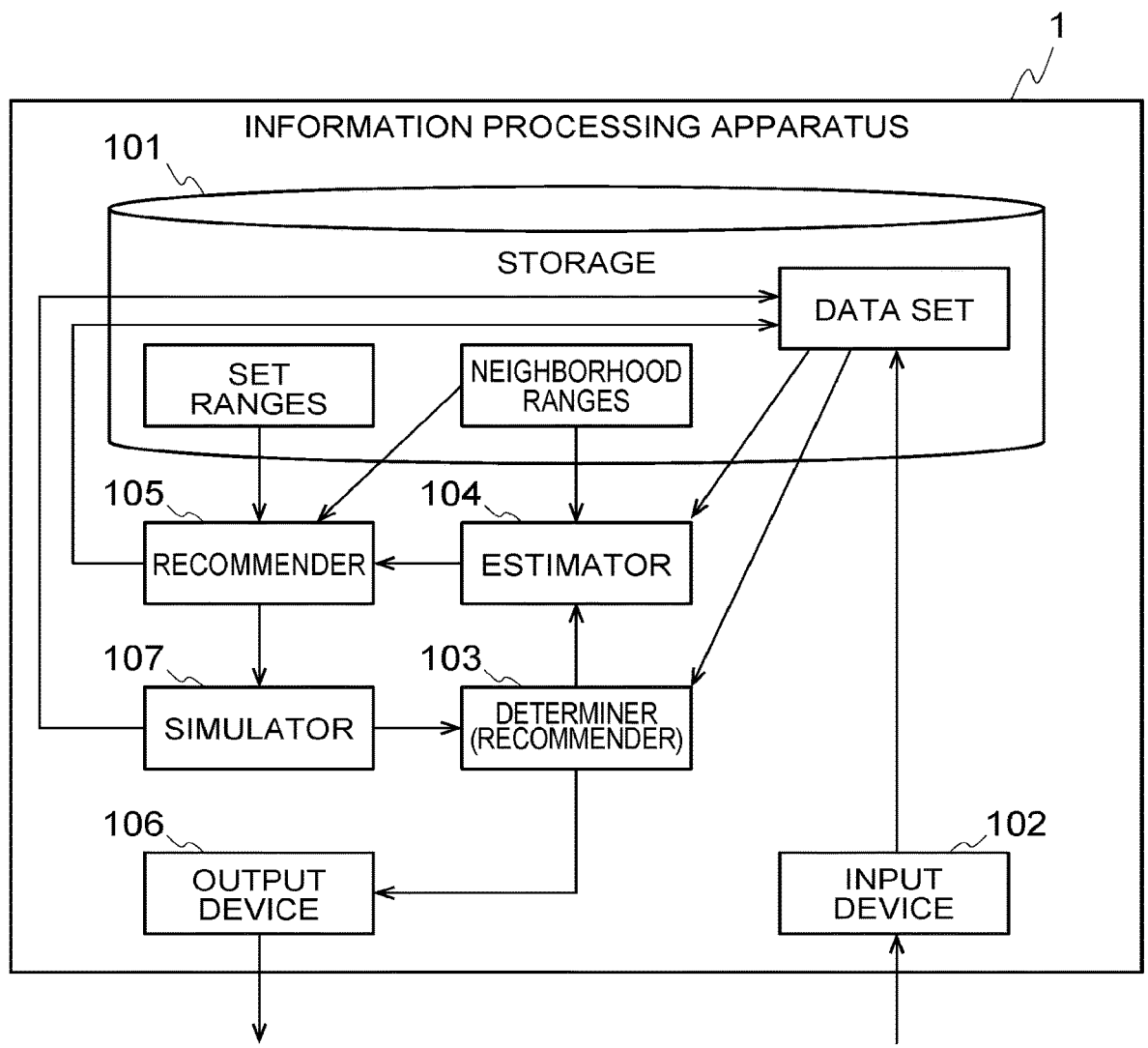
FIG. 2 is a block diagram illustrating an alteration of an information processing apparatus.

In the example in FIG. 1, the information processing apparatus 1 outputs a recommended set value to the outside and acquires information relating to a result of a test from the outside. However, the information processing apparatus 1 may include a simulator that performs a test. In other words, the information processing apparatus 1 may double as a simulator. FIG. 2 is a block diagram illustrating an alteration of the information processing apparatus 1. FIG. 2 illustrates a case where the information processing apparatus 1 includes a simulator 107. In the example in FIG. 2, the simulator 107 performs a simulation using a recommended set value and a result of the simulation is fed to, e.g., the determiner 103.

Figure 3:
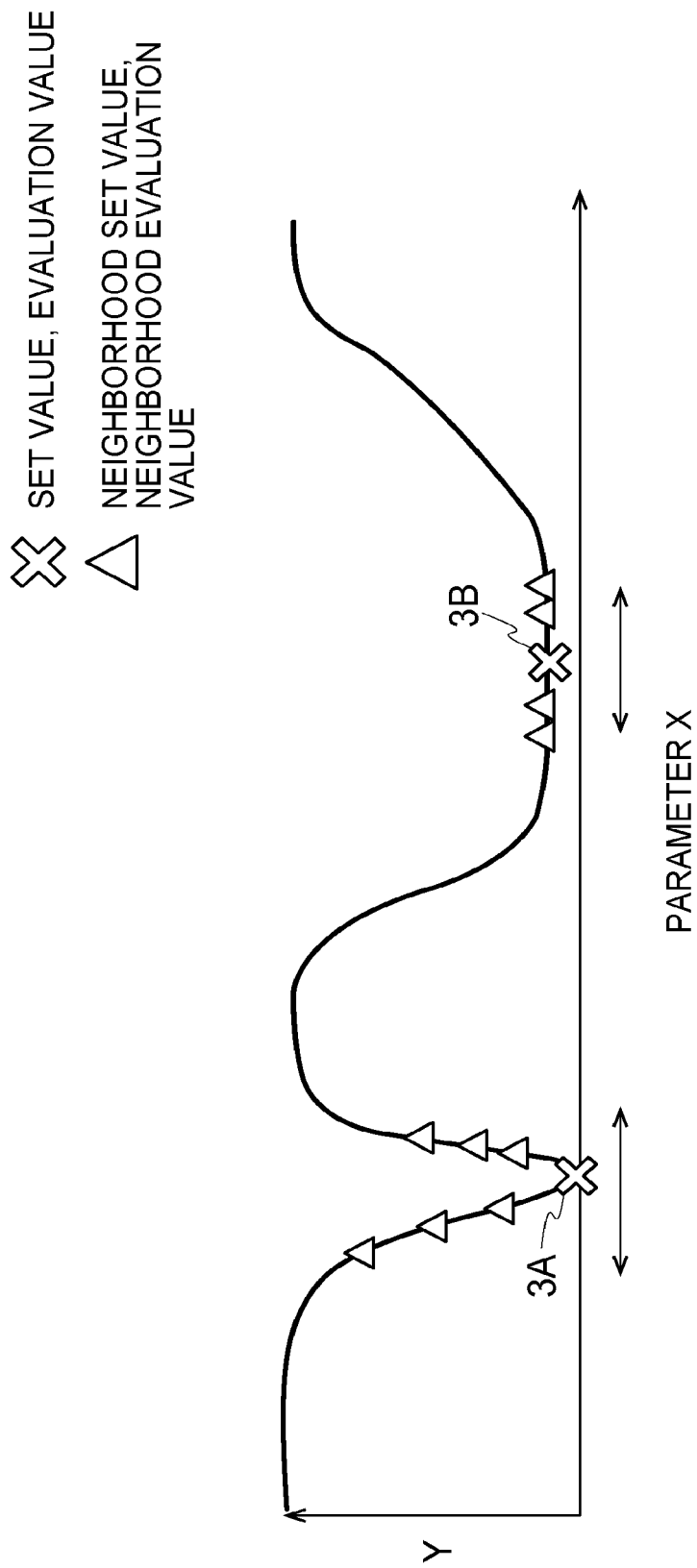
FIG. 3 is a diagram for describing an estimated optimum value.

FIG. 3 is a diagram for describing an estimated optimum value. A graph indicating a relationship between a parameter X and an evaluation value Y is illustrated.

The evaluation value Y means a value of evaluation of a result of a test performed based on a recommended set value. An evaluation value may be the same as a test result or may be an arithmetic value based on a test result. For example, where an ideal test result is known, an evaluation value may be a difference between an actual test result and the ideal test result. Also, data (can also be referred to as "vector") including a plurality of values may be obtained by a single test. In such case, a single evaluation value may be estimated based on the plurality of values.

Where it is assumed that a smaller value of the evaluation value Y is optimum, a y-coordinate of a plot 3A is an optimum evaluation value. However, as indicated in FIG. 3, the line on the graph is steep in the vicinity of the plot 3A. Therefore, if a value of the parameter X fails to be correctly set to, and thus deviates from, an x-coordinate of the plot 3A, a very poor evaluation value is obtained.

On the other hand, the line on the graph is gentle in the vicinity of a plot 3B. A y-coordinate of the plot 3B is larger than the y-coordinate of the plot 3A, that is, the plot 3B is less evaluated than the plot 3A. However, the value of the parameter X does not exactly coincide with an x-coordinate of the plot 3B, the obtained evaluation value Y does not largely deviate from the y-coordinate of the plot 3B. Therefore, in some cases, the y-coordinate of the plot 3B can be regarded as an optimum value.

For example, there is a technique called Bayesian optimization that curbs time required for arithmetic operation by reduction of the number of tests. However, it is difficult to make an optimum value calculated by Bayesian optimization and an actual optimum value completely coincide with each other and these optimum values diverge not a little from each other. Therefore, in such case, use of the y-coordinate of the plot 3B rather than that of the plot 3A as an optimum value enables curbing a risk of obtaining a very poor evaluation value.

In this way, in the present embodiment, where an optimum set value for a parameter is searched for using a search technique such as Bayesian optimization, a highly stable value, in other words, a robust value is regarded as optimum. The triangle plots in FIG. 3 will be described later.

An internal configuration of the information processing apparatus 1 will be described. Note that the components illustrated in FIG. 1 are those for performing processing for determining a set value to be recommended next, and illustration of other components is omitted. Also, the components may be segmentalized or integrated. For example, the storage 101 may be divided according to, e.g., stored files. Also, components other than the storage 101 may be regarded as an arithmetic device. Also, a result of processing by each component may be fed to a component that performs following processing or may be stored in the storage 101 and acquired by the component that performs following processing through access to the storage 101.

The storage 101 stores data to be used in processing in the information processing apparatus 1. The data includes at least data indicating set ranges, data indicating neighborhood ranges, and a data set. Data other than these data may be stored, and for example, results of processing in the respective components in the information processing apparatus 1 may be stored.

Each set range means a range of values that can be determined as a set value. In other words, a range of values that can be set for a parameter and is a search range for searching for a recommended set value. It is assumed that the set ranges are stored in the storage 101 in advance by reception of an input of the set ranges from, e.g., a user.

FIG. 4 is a diagram illustrating an example of the data relating to the set ranges. In the example in FIG. 4, there are ten parameters $X_1$ to $X_{10}$ and a lower limit value and an upper limit value are indicated for each of the parameters. Each set range is a range from the lower limit value to the upper limit value. For example, a set range of the parameter $X_1$ is from 10 to 100.

A method for representing a set range is not specifically limited. For example, it is possible that a matrix A and a vector B are stored and X meeting AX+B<0 is set as a set range. Alternatively, it is possible that a vector A and a real number R are stored and X meeting |X−A|<R is set as a set range. Here, |B| represents a magnitude of the vector B. In another case, it is possible that various parameters of an inequality expression are stored and X meeting the inequality expression is set as a set range.

Each neighborhood range is a range that is applied to a recommended set value and is based on the set value and indicates a range of values regarded as neighboring the set value. Whether or not the set value is robust is determined using the neighborhood range.

FIG. 5 is a diagram illustrating an example of the data relating to the neighborhood ranges. In the example in FIG. 5, for each parameter, a neighborhood range can be obtained according to a set value of the parameter. A method for representing the neighborhood ranges is not limited to the example in FIG. 5. The neighborhood ranges may be indicated in a manner that is the same or different from a manner of indication of the set ranges.

The "additive" in the category "type" means that where a neighborhood lower limit of a certain parameter X is L and a neighborhood upper limit of the same is U, a neighborhood range is a range that is not less than X+L but not more than X+U. For example, with regard to the parameter $X_1$, it is indicated that a neighborhood lower limit is −5; and a neighborhood upper limit is +5. Therefore, when a value of the parameter $X_1$ is 35, the neighborhood range of the parameter $X_1$ is a range that is not less than 30 (=35−5) but not more than 40 (=35+5).

Also, the "multiplicative" in the category "type" means that where a neighborhood lower limit of a certain parameter X is L % and a neighborhood upper limit of the same is U %, a range that is not less than X×(100+L)/100 but not more than X×(100+U)/100 is a neighborhood range. For example, with regard to the parameter $X_2$, it is indicated that the neighborhood lower limit is −10% and the neighborhood upper limit is +10%. Therefore, when a value of the parameter $X_2$ is 2, a range that is not less than 1.8 (=2×(100−10)/100) but not more than 2.2 (=2×(100+10)/100) is the neighborhood range of the parameter $X_2$.

For example, where the "type" includes one type, either "additive" or "multiplicative" only, only the neighborhood lower limit and the neighborhood upper limit for each parameter may be indicated in the data of the neighborhood ranges.

It is assumed that the neighborhood ranges are stored in advance in the storage 101 through reception of an input of the neighborhood ranges from, e.g., the user. For example, a neighborhood range may be a tolerance range of deviation of a value of a specification of a product from an optimum value due to, e.g., product variation. Alternatively, a neighborhood range may be set based on recommended set values and data of set values selected in advance. For example, respective differences between the recommended set values and the set values selected in advance may be calculated and a minimum value of the differences may be set as a neighborhood lower limit for "additive" and a maximum value of the differences may be set as a neighborhood upper limit for "additive". Alternatively, the recommended set values may be divided by the set values selected in advance, respectively, to calculate respective quotients and a value obtained by subtraction of 1 from a minimum value of the quotients may be set as a neighborhood lower limit for "multiplicative" and a value obtained by subtraction of 1 from a maximum value of the quotients may be set as a neighborhood upper limit for "multiplicative".

The data set is data in which set values, and evaluation values or evaluation value variations relating to results of tests using the set values are associated with each other. As stated above, an evaluation value is a value of evaluation of a result of a test based on a recommended set value. An evaluation value variation indicates, for example, a magnitude of variation of y-coordinates of a plurality of plots existing in the vicinity of a plot corresponding to a set value in the graph illustrated in FIG. 3.

For example, in the vicinity of the plot 3A in FIG. 3, the line on the graph is steep, and thus, a variation of plots each indicated by a white triangle in the vicinity of the plot 3A is large. On the other hand, in the vicinity of the plot 3B, the line on the graph is gentle, and thus, a variation of plots each indicated by a white triangle in the vicinity of the plot 3B is small. In this way, a variation of y-coordinates of plots whose respective x-coordinates are included in a neighborhood range such as described above applied to an x-coordinate of a certain plot, that is, a certain set value is defined as "evaluation value variation".

Here, a plot whose x-coordinate is included in a neighborhood range is referred to as "neighborhood plot", the x-coordinate of the neighborhood plot is also referred to as "neighborhood set value", and a y-coordinate of the neighborhood plot is also referred to as "neighborhood evaluation value". Therefore, an evaluation value variation for a certain set value can be regarded as a variation of a plurality of neighborhood evaluation values related to the set value.

As described above, although an evaluation value variation indicates a variation of a plurality of neighborhood evaluation values related to a relevant set value, how to represent a value of the evaluation value variation may arbitrarily be determined. For example, an evaluation value variation may be defined as a standard deviation of a plurality of neighborhood evaluation values. Alternatively, an evaluation value variation may be defined a difference between a maximum value and a minimum value of a plurality of neighborhood evaluation values, and in such case, an evaluation value variation is represented by the following expression.

[Expression 1]

$$\delta(x) = \max_{\tilde{x} \in \Delta(x)} f(\tilde{x}) - \min_{\tilde{x} \in \Delta(x)} f(\tilde{x}) \qquad (1)$$

In the above expression, "$\delta(x)$" is an evaluation value variation for a set value x, "$\Delta(x)$" is a neighborhood range for the set value x, "$\tilde{x}$" is a neighborhood set value within the neighborhood range $\Delta(x)$ and "$f(\tilde{x})$" is a neighborhood evaluation value for the neighborhood set value.

Here, it is assumed that the evaluation values or the evaluation value variations included in the data set are received from the evaluation apparatus 2. The evaluation apparatus 2 calculates an evaluation value variation; however, calculating all neighborhood evaluation values to calculate an evaluation value variation requires a considerable amount of time and thus is not realistic. Therefore, the evaluation apparatus 2 may randomly select a plurality of neighborhood set values, sample neighborhood evaluation values for the selected neighborhood set values and calculate an evaluation value variation based on the sampled neighborhood evaluation values.

FIG. 6 is a diagram illustrating an example of the data set. In the example in FIG. 6, there are ten parameters $X_1$ to $X_{10}$ and on each row of the table, respective set values of the ten parameters and an evaluation value for the set values are indicated.

Note that only either the evaluation values or the evaluation value variations may be registered in the data set or both the evaluation values and the evaluation value variations may be registered. This is because, although described later, there are a case where an evaluation value of a recommended set value is estimated using an evaluation value registered in the data set and a case where an evaluation value variation for a recommended set value is estimated using an evaluation value variation registered in the data set.

The data set is updated each time a set value is determined by the recommender 105, and the determined set value is added and registered in the data set. Also, the data set is updated each time an evaluation value or an evaluation value variation for a recommended set value is acquired from the outside via the input device 102, and as in the example in FIG. 6, the evaluation value or the evaluation value variation is registered in the data set in association with the set value.

In the data set, test data may be registered in advance. In other words, a value that is not acquired by performing an actual test may be included in the data set.

One parameter or a plurality of parameters may be used in a test. If there is a plurality of parameters, the parameters are independent from one another and have individual values. Also, the values of the parameters may be continuous values, discrete values or logical values (category variables). In other words, the types of the parameters are not specifically limited. For example, the parameters may include physical parameters such as a temperature and pressure. Also, the parameters may include test-related parameters such as processing time and a processing condition.

Also, although in the example in FIG. 6, one evaluation value is provided for one set of parameters $X_1$ to $X_{10}$, there may be a one-to-one correspondence or a many-to-many correspondence between parameters and evaluation values. Also, where a plurality of evaluation values are provided for a plurality of parameters, a comprehensive evaluation value may be estimated based on these evaluation values.

The input device 102 receives an input of information necessary for processing in the information processing apparatus 1, from the outside. For example, information such as an evaluation value and/or an evaluation value variation for a recommended set value is acquired. As described above, the information is registered in the data set. Also, the input device 102 may receive information such as a set range, a neighborhood range and a termination condition for determining whether or not the determiner 103 decides an optimum value.

The determiner 103 determines whether or not to continue recommendation of a set value based on a predetermined termination condition. Then, if recommendation of a set value is stopped, the determiner 103 decides a decided value regarded as optimum, based on previous set values. For example, if the number of tests performed or elapsed time exceeds a threshold value, the determiner 103 may terminate recommendation of a set value and select a set value regarded as an optimum value, from previous set values. For example, a set value when an evaluation value variation stored in the storage 101 is minimum may be determined as an optimum set value. Also, from among previously recommended set values, a set value whose predicted value of an evaluation value variation, which will be described later, is minimum may be determined as a set value regarded as optimum or a set value whose value of an acquisition function, which will be described later, is maximum or minimum may be determined as a set value regarded as optimum. Furthermore, a set value in a set range in which an evaluation value variation is minimized, which will be described later, may be determined as a set value regarded as optimum.

The estimator 104 estimates a graph indicating a relationship, that is, a relational expression between a set value and an evaluation value variation, based on the data set.

A relational expression between a set value and an evaluation value variation is represented by the following expression.

[Expression 2]

$$y=\mu_n(x) \tag{2}$$

A set value is input to the "x" in the relational expression. The "y" in the relational expression denotes an evaluation value variation.

In estimation of the relational expression $y=\mu_n(x)$, for example, the parameter of $\mu_n(x)$ may be adjusted according to a regression procedure so that a sum of squares of errors between evaluation value variations recorded in the data set and values of y obtained by the above relational expression is calculated and the calculated square sum becomes minimum. For the regression procedure, e.g., linear regression, Lasso regression, ElasticNet regression, random forest regression or Gaussian process regression may be used.

For calculation of an acquisition function, which will be described later, the estimator 104 may calculate a relational expression between a mean and a variance of a probability distribution of the relational expression $\mu_n(x)$. For a method for calculation of the relational expression, Gaussian process regression and random forest regression may be used.

For example, when Gaussian process regression is used, the mean of the probability distribution is represented by the following expression.

[Expression 3]

$$\mu_n(x)=\mu_0(x)+k(x)^T(K+\sigma^2 I)^{-1}(y-m) \tag{3}$$

In Expression (3) above, "$x_i$" is a set value for an i-th parameter $X_i$ and "y" is an evaluation value variation. Also, "m" is a mean vector of the evaluation value variation. The mean vector m is represented by a function $\mu_0(x_i)$ that does not depend on a variable n. Also, a covariance $K_{ij}$ of a set value $x_i$ and a set value $x_j$ is represented by an arbitrary kernel function $k(x_i, x_j)$. The kernel function may be, for example, a squared exponential kernel, a Matern kernel or a linear kernel. Here, $k_i(x)=k(x, x_i)$ and $\sigma^2$ is an arbitrary constant. Also, T represents transposition.

Also, the variance $\sigma_n^2(x)$ of the probability distribution is represented by the following expression.

[Expression 4]

$$\sigma_n^2(x)=k(x,x)-k(x)^T(K+\sigma^2 I)^{-1}k(x) \tag{4}$$

The estimator 104 may estimate a relational expression indicating a relationship between a set value and an evaluation value such as illustrated in FIG. 3, rather than a relational expression between a set value and an evaluation value variation. A method for the estimation may be the same as that of estimation of a relational expression between a set value and an evaluation value variation. However, in such case, a relational expression indicating a relationship between an evaluation value and an evaluation value variation is necessary.

For example, it is assumed that "y" in relational expression $y=\mu_n(x)$ represents not an evaluation value variation but an evaluation value. In this case, where an evaluation value variation is, for example, a difference between a maximum value and a minimum value of a plurality of neighborhood evaluation values as described above, the evaluation value variation is represented by the following expression.

[Expression 5]

$$\mu_\delta(x) = \max_{\tilde{x}\in\Delta(x)} \mu_n(\tilde{x}) - \min_{\tilde{x}\in\Delta(x)} \mu_n(\tilde{x}) \tag{5}$$

In the above expression, "$\mu_\delta(x)$" is an evaluation value variation for a set value x, "$\Delta(x)$" is a neighborhood range for the set value x, "$\tilde{x}$" is a neighborhood set value included in the neighborhood range and "$\mu_n(\tilde{x})$" is a neighborhood evaluation value for the neighborhood set value. Where the estimator 104 estimates a relational expression between a set value and an evaluation value, a relational expression that enables calculation of an evaluation value variation from neighborhood evaluation values such as Expression (5) above is determined in advance.

Also, where the estimator 104 estimates a relational expression between a set value and an evaluation value, the estimator 104 may calculate a relational expression between a mean and a variance of a probability distribution of the relational expression $\mu_\delta(x)$, for calculation of an acquisition function.

A relational expression indicating a mean and a variance of a probability distribution of the relational expression $\mu_\delta(x)$ may be obtained by, for example, sampling. For example, where "y" in the relational expression $y=\mu_n(x)$ is an evaluation value, evaluation values are sampled from a distribution based on the mean and the variance in Expressions (3) and (4) above and an evaluation value variation is estimated based on a result of the sampling. The sampling and estimation may be repeated a plurality of times to determine a mean and a variance of a plurality of resulting evaluation value variations as the mean and variance of the probability distribution of the relational expression $\mu_\delta(x)$. Alternatively, where an evaluation value variation is a difference between maximum and minimum neighborhood evaluation values, the following expression may be employed as an expression indicating a variance of a probability distribution of the relational expression $\mu_\delta(x)$.

[Expression 6]

$$\sigma_\delta^2(x) = \sigma_n^2\left(\underset{\tilde{x}\in\Delta(x)}{\mathrm{argmax}}\mu_n(\tilde{x})\right) + \sigma_n^2\left(\underset{\tilde{x}\in\Delta(x)}{\mathrm{argmax}}\mu_n(\tilde{x})\right) \qquad (6)$$

Furthermore, the estimator 104 may estimate a weighted sum of a mean and a variance of a probability distribution of the relational expression $\mu_\delta(x)$ between a set value and an evaluation value variation. The weighted sum is represented by the following expression using a mean and a variance of a probability distribution of the relational expression $y=\mu_n(x)$ between a set value and an evaluation value, a neighborhood range, and a real number $\beta_n$.

[Expression 7]

$$\max_{\tilde{x}\in\Delta(x)}\left(\mu_n(\tilde{x}) - \beta_n\sigma_n^2(\tilde{x})\right) - \min_{\tilde{x}\in\Delta(x)}\left(\mu_n(\tilde{x}) + \beta_n\sigma_n^2(\tilde{x})\right) \qquad (7)$$

As above, the estimator 104 estimates a relational expression (graph) between a set value and an evaluation value or an evaluation value variation. The estimation is performed again upon update of the data set, that is, upon acquisition of a corresponding value for a set value. In other words, a relational expression (graph) relating to a set value and a corresponding value is updated.

Update of the relational expression (graph) relating to a set value and an evaluation value or an evaluation value variation may be performed each time the data set is updated, or may be performed when the data set is updated a plurality of predetermined numbers of times.

The recommender 105 determines a set value to be recommended next, in other words, a set value to be used in a next test from a set range, based on the relational expression of the evaluation value variation for the set value, which has been estimated by the estimator 104.

For example, the recommender 105 may detect a set value that makes the evaluation value variation smaller, based on the relational expression of the evaluation value variation for the set value, and determine the set value as a set value to be recommended next. In other words, the recommender 105 may search for a set value estimated to be more robust than a last set value within a set range and employ the set value as a set value to be used in a present test. For example, a value that makes the evaluation value variation smaller can be found by various optimization procedures such as a full search, a random search, a grid search, a gradient method, L-BFGS, DIRECT, CMA-ES and a multi-start local search.

Alternatively, the recommender 105 may determine a recommended set value based on an acquisition function that is based on a mean and a variance of an evaluation value variation. For example, the recommender 105 may, where a larger value of the acquisition function is better, recommend a set value that maximizes the value of the acquisition function, and where a smaller value of the acquisition function is better, recommend a set value that minimizes the value of the acquisition function. The below description will be provided on the assumption that a larger value of the acquisition function is better. For the acquisition function, for example, PI (probability of improvement) may be used or EI (expected improvement) may be used. Alternatively, UCB (upper confidence bound), Thompson sampling (TS), entropy search (ES) or mutual information (MI) may be used. For example, in the case of UCB, the acquisition function $\alpha_n(x)$ can be calculated by the following expression using an arbitrary constant $\beta_n$.

[Expression 8]

$$\alpha_n(x) = \mu_n(x) + \beta_n\sigma_n(x) \qquad (8)$$

Also, the recommender 105 may randomly select a plurality of neighborhood set values from a neighborhood range for a selected set value and sequentially recommends the neighborhood set values as a set value, rather than recommending a set value selected in such a manner as described above as it is.

Also, the recommender 105 may calculate the acquisition function based on the weighted sum in Expression (7) above and determine a value that makes a value of the acquisition function larger as a recommended set value. In such case, the acquisition function is represented by, for example, the following expression.

[Expression 9]

$$\alpha_n(x) = -\left(\max_{\tilde{x}\in\Delta(x)}\left(\mu_n(\tilde{x}) - \beta_n\sigma_n^2(\tilde{x})\right) - \min_{\tilde{x}\in\Delta(x)}\left(\mu_n(\tilde{x}) + \beta_n\sigma_n^2(\tilde{x})\right)\right) \qquad (9)$$

Also, rather than recommending the set value obtained by the above-described method as it is, the recommender 105 may search, again, for a neighborhood set value that maximizes a value of an acquisition function based on a mean and a variance of evaluation values within a neighborhood range for the set value and determine the neighborhood set value as a recommended set value. For example, the acquisition function is represented by the following expression.

[Expression 10]

$$\alpha_n(\tilde{x}) = \mu_n(\tilde{x}) + \beta_n\sigma_n^2(\tilde{x}) \qquad (10)$$

The explanation described above is based on the assumption that the data set exists and a set value is recommended. However, where test data is not registered in the data set, when the user performs a test for the first time, the user may wish the information processing apparatus 1 to recommend a set value. In such case, the information processing apparatus 1 cannot determine a recommended set value according to the aforementioned method, and thus may recommend a predetermined value or determine a recommended set value using a random number, a Latin square or a sobol sequence. In other words, a first recommended set value may be a predetermined value or one determined using a random number, a Latin square or a sobol sequence.

The output device 106 outputs processing results of the respective components. For example, a recommended set value or a set value regarded as optimum are output. Also, the output device 106 may output data stored in the storage 101 such as the data set, upon reception of an instruction via the input device 102.

Also, a form of output of the output device 106 is not specifically limited and may be, for example, a table or an image. For example, the output device 106 may generate a graph based on data in, e.g., the data set and output the graph.

As in FIG. 2, where the information processing apparatus 1 includes the simulator 107, the simulator 107 performs a simulation with a recommended set value set for a parameter of a model and calculates an evaluation value based on a result of the simulation. It is assumed that an expression for calculation of the evaluation value is determined in advance. Also, where the estimator 104 estimates a relational expression between a set value and an evaluation value variation, the simulator 107 calculates not only an evaluation value for the recommended set value but also for neighborhood set values, that is, neighborhood evaluation values. Then, based on the neighborhood evaluation values, the simulator 107 calculates an evaluation value variation. Since it is not realistic to calculate all neighborhood evaluation values, several neighborhoods set values may be sampled and a neighborhood evaluation value may be calculated for each of the sampled neighborhood set values.

Where the information processing apparatus 1 includes no simulator 107, the evaluation apparatus 2 receives a test result from the user and calculates an evaluation value and an evaluation value variation. The calculation of the evaluation value and the evaluation value variation may be performed in a manner that is the same as the above.

Figure 7:
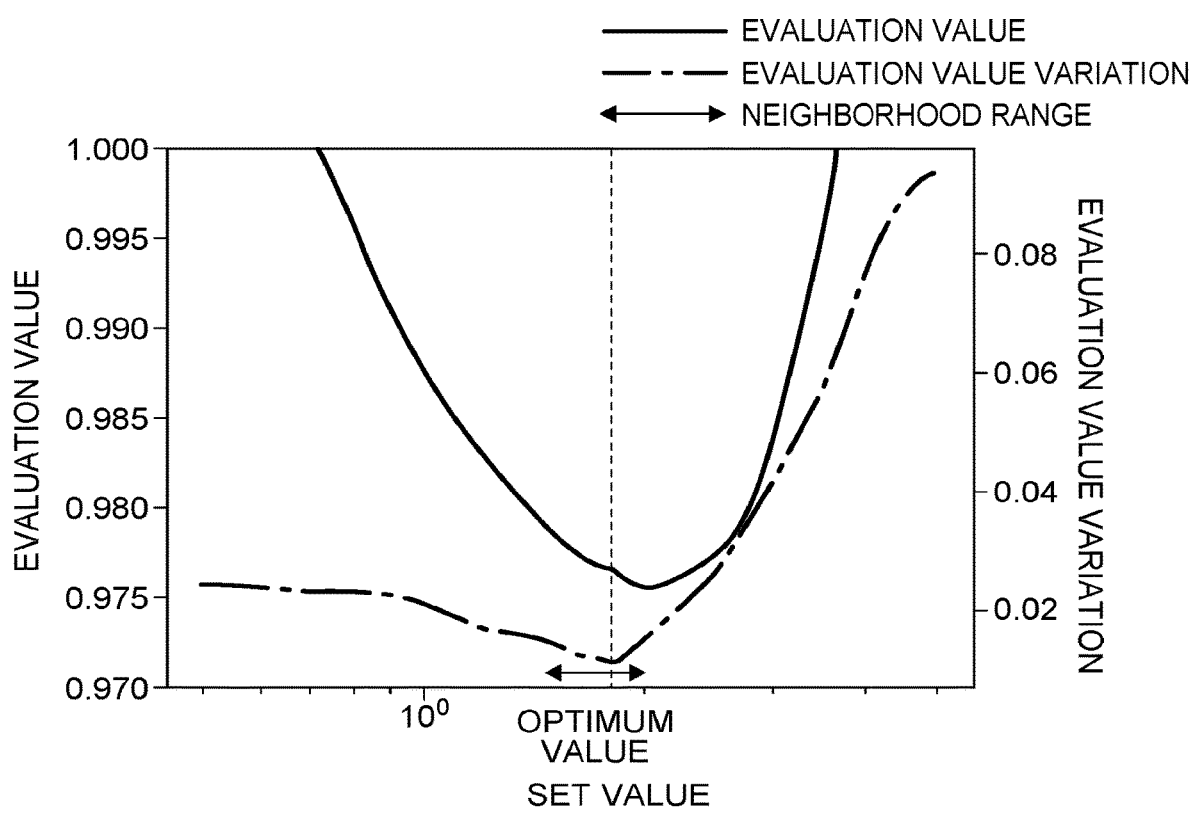
FIG. 7 is a first diagram indicating an estimated optimum value.

FIG. 7 is a first diagram illustrating an estimated optimum value. In FIG. 7, a graph indicating a relationship between a set value and an evaluation value is indicated by a solid line and a graph indicating a relationship between a set value and an evaluation value variation is indicated by an alternate long and short dash line. The abscissa axis represents the set value and the ordinate axis represents the calculated evaluation value or evaluation value variation. Also, the dotted straight line indicates an optimum value of a relevant parameter, the optimum value being obtained by the information processing apparatus 1. Also, the double arrow indicates a neighborhood range.

From FIG. 7, it can be seen that the optimum set value is not one that minimizes not the evaluation value but one that minimizes the evaluation value variation. Also, it can be seen that the line of the evaluation value on the graph becomes gentle in the neighborhood of the optimum set value. In this way, it can be seen that a highly robust value is selected as an optimum value.

Note that what are indicated in the figure and a form of the indication may arbitrarily be determined. For example, in FIG. 7, two lines are indicated on a graph but may be divided into respective graphs. Also, in FIG. 7, a neighborhood range is indicated by a double arrow, a plot relating to a limit value of a neighborhood range, that is, a plot relating to a neighborhood evaluation value for a minimum or maximum neighborhood set value may be provided. Also, a maximum neighborhood evaluation value may be plotted.

Figure 8:
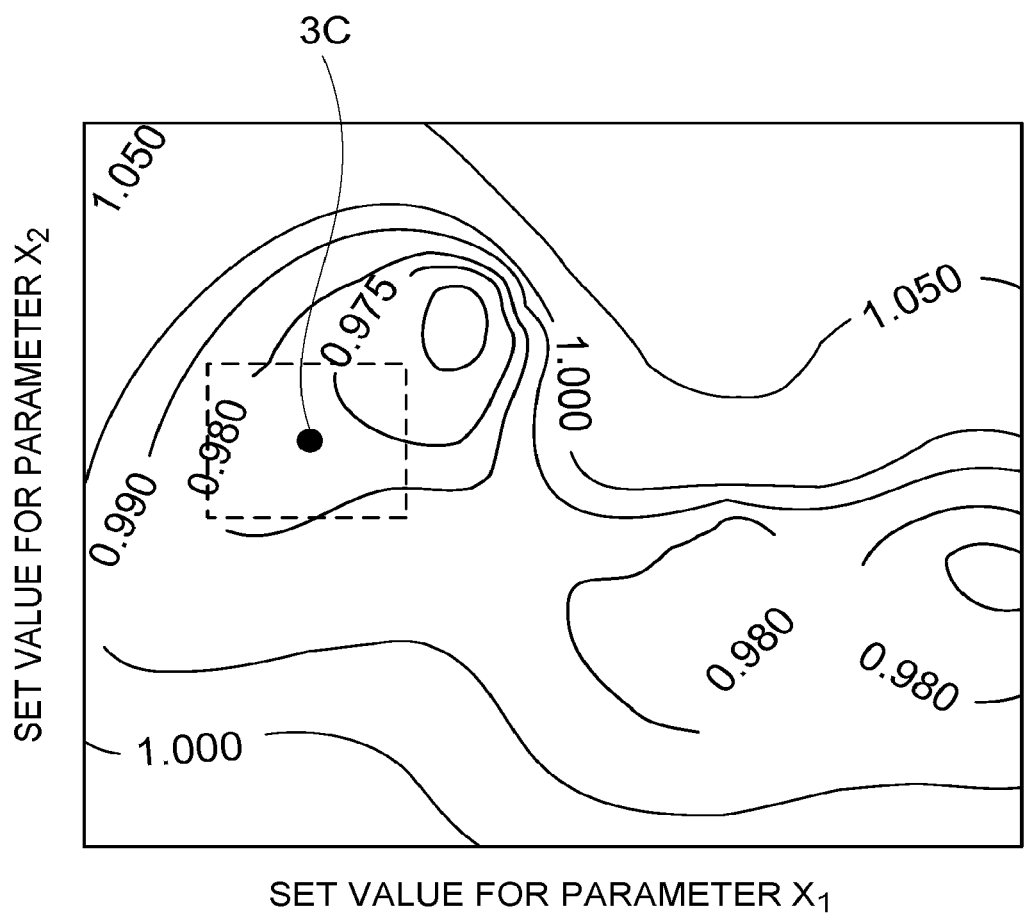
FIG. 8 is a second diagram indicating an estimated optimum value.

FIG. 8 is a second diagram illustrating an estimated optimum value. The ordinate axis and the abscissa axis in FIG. 8 represent respective set values of different parameters and contour lines represent evaluation values. Also, the dotted quadrangular box around a plot 3C indicating an optimum value indicates a neighborhood range for the optimum value. FIG. 8 indicates that as the distance between contour lines is larger, the evaluation value variation is smaller. Therefore, the optimum value exists at a position at which contour lines are low and the distance between the contour lines is large.

Figure 9:
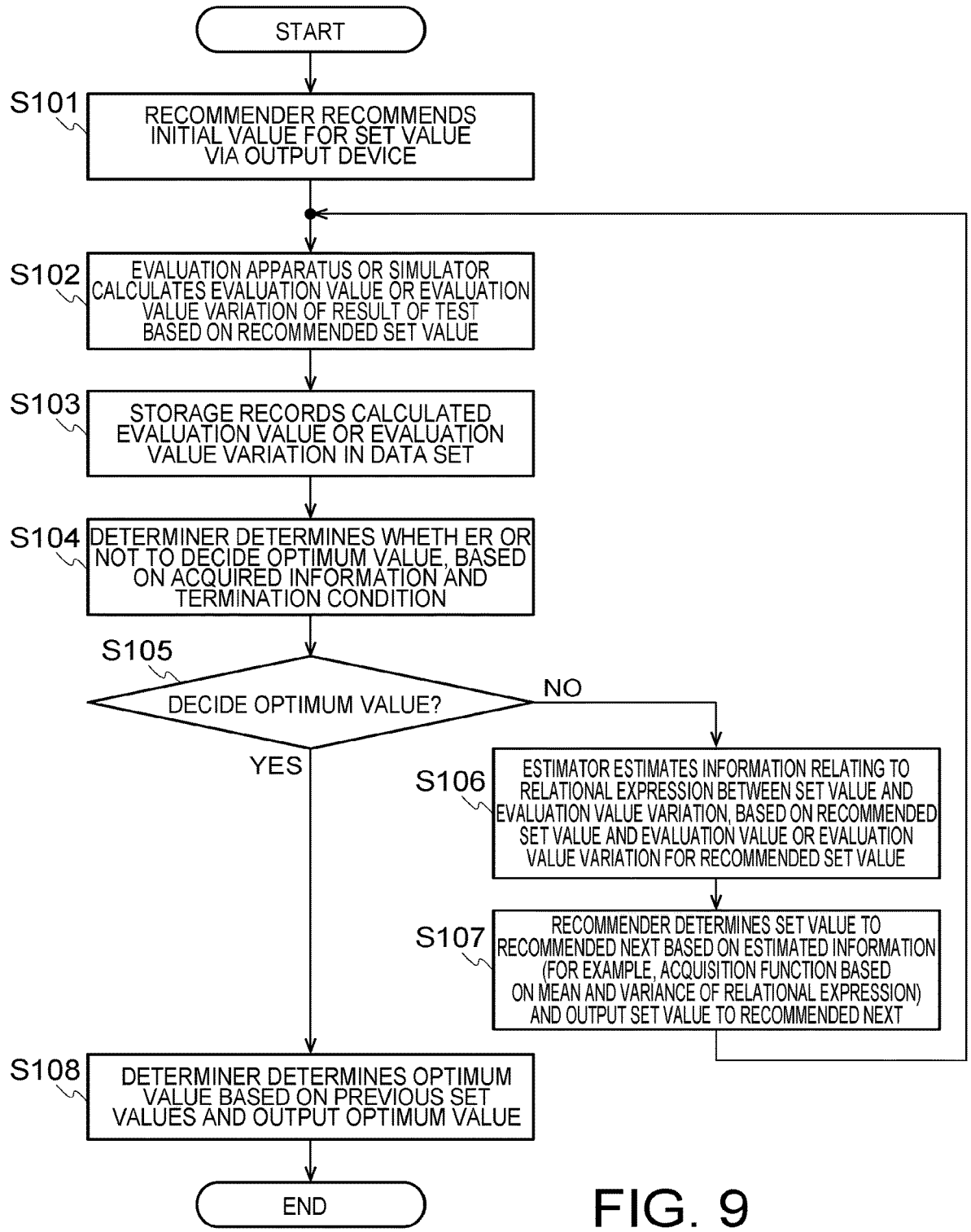
FIG. 9 is a schematic flowchart of overall processing in an information processing apparatus according to the first embodiment.

Next, a flow of processing in the components will be described. FIG. 9 is a schematic flowchart of overall processing in the information processing apparatus 1 according to the first embodiment.

The recommender 105 recommends an initial value of a set value (S101). As described above, for the initial value, a predetermined value may be used or the recommender 105 may select a value within a set range based on a predetermined condition. A test is performed using the initial value, and the evaluation apparatus 2 or the simulator 107 calculates an evaluation value or an evaluation value variation based on a result of the test that is based on the recommended set value (S102). The storage records the recommended set value and the calculated evaluation value or evaluation value variation in the data set in association with each other (S103).

The determiner 103 determines whether or not to decide an optimum value, based on a termination condition (S104). As described above, the termination condition is determined in advance. If an optimum value is not decided (NO in S105), the estimator 104 estimates a relational expression between the set value and the evaluation value variation and information (e.g., a mean and a variance) relating to the relational expression based on the recommended set value and the corresponding evaluation value or evaluation value variation (S106). The recommender 105 determines a set value to be recommended next based on the estimated information and outputs the set value (S107). For example, a mean and a variance of the evaluation value variation may be input to parameters of an acquisition function and a value that maximizes a value of the acquisition function may be determined as a set value to be recommended next. Also, a neighborhood set value for the calculated value may be determined as a set value to be recommended next.

Upon the next set value being recommended, the processing in S102 to S104 is performed again. In this way, decision of a set value and determination for the set value are repeated. If an optimum value is decided (YES in S104), the determiner 103 decides an optimum value based on previous set values (S107), and the flow ends.

As above, the information processing apparatus 1 of the present embodiment estimates a relational expression between a set value and a variation of neighborhood evaluation values related to the set value, and recommends a set value to be used in a next test, based on the relational expression. Repetition of a test by set values being sequentially recommended in this way enables calculation of a set value that reduces variation in evaluation value, that is, a robust set value as an optimum value. Also, use of Bayesian estimation enables obtainment of a set value that reduces an evaluation value variation with fewer tests.

Second Embodiment

In the above embodiment, recommendation of a set value that provides a favorable evaluation value variation is repeated to search for a robust set value. In the present embodiment, a set value that also provides a more favorable evaluation value is recommended. Parts of the present embodiment that are different from those of the above embodiment will be described and description of parts of the present embodiment that are in common with the above embodiment will be omitted.

In the present embodiment, it is assumed that an evaluation apparatus 2 or a simulator 107 calculates at least one of a mean of neighborhood evaluation values and a worst one of the neighborhood evaluation values and the at least one is registered in a data set. For example, where a smaller evaluation value is better, a maximum one of neighborhood evaluation values is a worse one, and where a larger evaluation value is better, a minimum one of neighborhood evaluation values is a worst one.

Where a smaller evaluation value is desired, if "f(x)" is an evaluation value for a set value x and "Δ'(x)" is a neighborhood range for the set value x, a worst neighborhood evaluation value can be represented by the following expression.

[Expression 11]

$$f_{max}(x) = \max_{\tilde{x} \in \Delta'(x)} f(\tilde{x}) \quad (11)$$

The mean of neighborhood evaluation values and the worst neighborhood evaluation value may be calculated using neighborhood evaluation values used for calculation of an evaluation value variation. Alternatively, neighborhood evaluation values may be calculated again using a neighborhood range that is different from the neighborhood range used for calculation of the evaluation value variation, to calculate the mean of neighborhood evaluation values and the worse neighborhood evaluation value.

An estimator 104 of the present embodiment estimates a relational expression between the set value and the mean of the neighborhood evaluation values or the worst neighborhood evaluation value, based on the data set. A method for estimation of the relational expression may be any of the methods stated above in the estimation of a relational expression between a set value and an evaluation value variation. In addition, for the method for estimation of the relational expression between the set value and the mean of the neighborhood evaluation values or the worst neighborhood evaluation value, it is not necessary to use a method that is the same as a method for estimation of a relational expression between the set value and the evaluation value variation.

Also, the estimator 104 may calculate a relational expression between a mean and a variance of a probability distribution of a relational expression between the set value and the mean of the neighborhood evaluation values. Also, the estimator 104 may calculate a relational expression between a mean and a variance of a probability distribution of a relational expression between the set value and the worst neighborhood evaluation value. For example, the mean $\mu_\delta(x)$ of the probability distribution of the relational expression between the set value and the worst neighborhood evaluation value is represented by the following expression.

[Expression 12]

$$\mu_\delta(x) = \max_{\tilde{x} \in \Delta'(x)} \mu_n(\tilde{x}) \quad (12)$$

In the above expression, "Δ'(x)" is a neighborhood range, "$\tilde{x}$" is a neighborhood set value and "f($\tilde{x}$)" is a neighborhood evaluation value for the neighborhood set value. In the above expression, it is assumed that a largest neighborhood evaluation value is the worst neighborhood evaluation value.

Also, the variance $\sigma_\delta^2(x)$ of the probability distribution of the relational expression between the set value and the worst neighborhood evaluation value is represented by, for example, the following expression.

[Expression 13]

-continued $$\sigma_\delta^2(x) = \sigma_n^2\left(\operatorname*{argmax}_{\tilde{x} \in \Delta'(x)} \mu_n(\tilde{x})\right) \quad (13)$$

Also, the estimator 104 may calculate a weighted sum of the relational expressions of the calculated mean and the calculated variance. For example, a weighted sum of a mean and a variance of a probability distribution of the relational expression between the set value and the worst neighborhood evaluation value is represented, for example, by the following expression using a real number $\beta_n$.

[Expression 14]

$$\max_{\tilde{x} \in \Delta'(x)} \left(\mu_n(\tilde{x}) - \beta_n \sigma_n^2(\tilde{x})\right) \quad (14)$$

A recommender 105 of the present embodiment determines a set value to be recommended next, based further on the relational expression for the mean of the neighborhood evaluation values or the relational expression of the worst neighborhood evaluation value. A search method and an acquisition function used for determination of the set value to be recommended may be the same as those of the above embodiment.

For example, a recommended set value may be determined based on a weighted sum of an evaluation value variation for a set value and a mean of neighborhood evaluation values for the set value or a worst neighborhood evaluation value for the set value. For example, a value that minimizes the weighted sum may be determined as the recommended set value.

Also, a recommended set value may be determined, for example, based on an acquisition function that is based on a mean and a variance of a relational expression of an evaluation value variation and a mean and a variance of a relational expression of a mean or a worse neighborhood evaluation value of neighborhood evaluation values. For example, a value that maximizes a value of the acquisition function may be determined as the recommended set value.

Also, for example, a weighted sum of an acquisition function $\alpha_\delta(x)$ relating to an evaluation value variation and an acquisition function $\alpha_{max}(x)$ of a mean or a worse neighborhood evaluation value of neighborhood evaluation values may be calculated, and based on the weighted sum, a recommended set value may be determined. For example, a value that maximizes the weighted sum may be determined as the recommended set value.

Also, the recommender 105 may determine a recommended set value based on an acquisition function that is based on a weighted sum. For example, a value of a parameter that maximizes a value of the acquisition function may be determined as a recommended set value. For the weighted sum used, for example, a weight sum of a mean and a variance of a probability distribution of a relational expression between a set value and an evaluation value variation or a weight sum of a mean and a variance of a probability distribution of a relational expression between a set value and a worse evaluation value is used. For example, the acquisition function that is based on the weighted sum is represented by the following expression using an arbitrary real number $\lambda$.

[Expression 15]

-continued $$\alpha_n(x) = -\left(\max_{\tilde{x}\in\Delta(x)}\left(\mu_n(\tilde{x}) - \beta_n\sigma_n^2(\tilde{x})\right) - \lambda\min_{\tilde{x}\in\Delta(x)}\left(\mu_n(\tilde{x}) + \beta_n\sigma_n^2(\tilde{x})\right)\right) \quad (15)$$

Furthermore, the recommender 105 may determine a recommended set value based on an acquisition function that is based on an estimated mean and an estimated variance of evaluation values, again, within a neighborhood range for a value obtained by the above acquisition function. For example, a value that maximizes a value of the acquisition function may be determined as the recommended set value. For example, the acquisition function is represented by the following expression.

[Expression 16]

$$\alpha_n(\tilde{x}) = \mu_n(\tilde{x}) + \alpha_n\sigma_n^2(\tilde{x}) \quad (16)$$

In this way, the present embodiment is different from the first embodiment in, e.g., the information estimated by the estimator 104 and the acquisition function used by the recommender 105 in order to determine a recommended set value. However, a flow of processing in the present embodiment is the same as that of the first embodiment. Therefore, the flow in the present embodiment is skipped.

As above, in the present embodiment, a recommended set value is determined using a mean or a worse neighborhood evaluation value of neighborhood evaluation values. Consequently, a set value that makes both an evaluation value and an evaluation value variation for a set value favorable simultaneously is recommended. Therefore, it is possible to obtain an optimum set value with a number of simulations that is smaller than that of the above embodiment.

At least a part of either of the above embodiments may be implemented by a dedicated electronic circuit (that is, hardware) such as an IC (integrated circuit) with, e.g., a processor and a memory mounted thereon. Also, at least a part of either of the above embodiments may be implemented by execution of software (program). For example, processing in either of the embodiments can be implemented by using a general-purpose computer apparatus as basic hardware and making a processor such as a CPU mounted in the computer apparatus execute a program.

For example, the information processing apparatus 1 can be formed by one or more computers. Also, the simulator 107 can be formed by a computer. In other words, the information processing system including the information processing apparatus and the simulator 107 can be formed by a plurality of computers.

For example, it is possible to use a computer as the apparatus of either of the above embodiments by the computer reading dedicated software stored in a computer-readable storage medium. A type of the storage medium is not specifically limited. Also, it is possible to use a computer as the apparatus of either of the above embodiments by installing dedicated software downloaded via a communication network on the computer. In this way, information processing via software is specifically implemented using hardware resources.

Figure 10:
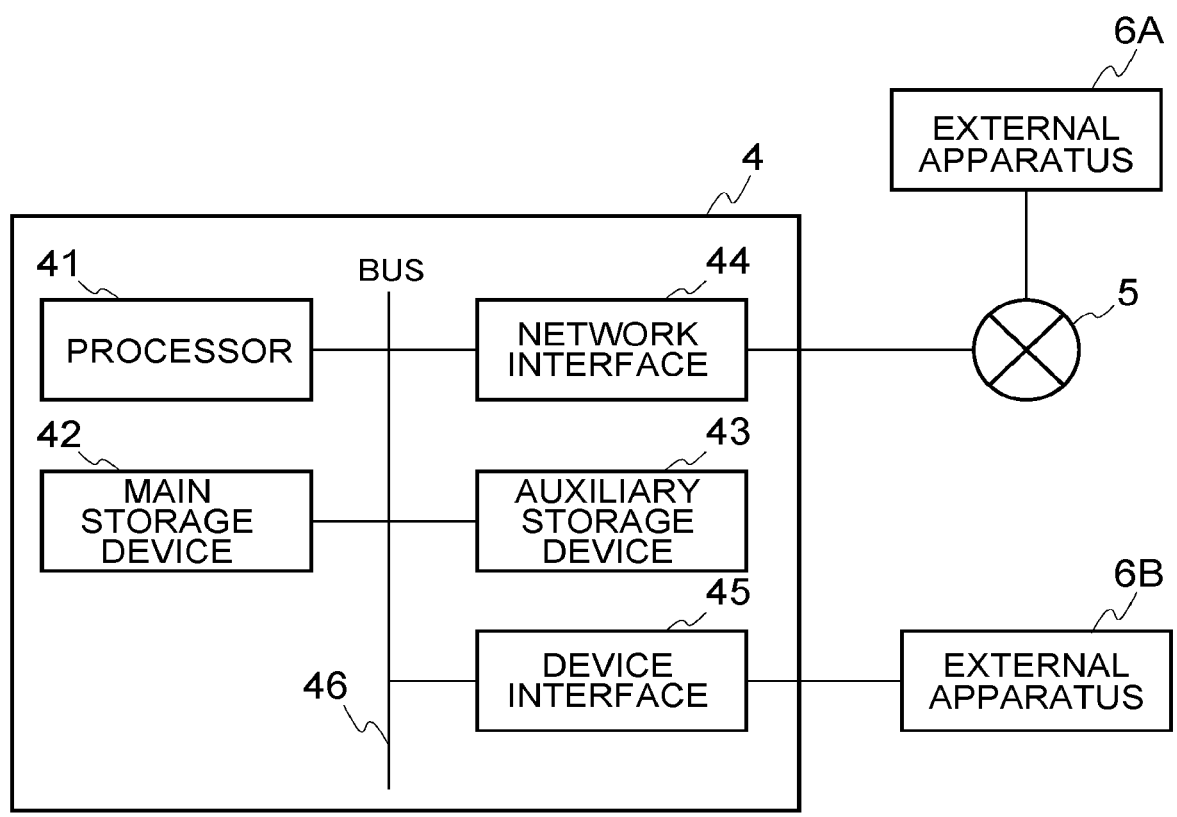
FIG. 10 is a block diagram illustrating an example of a hardware configuration in an embodiment of the present invention.

FIG. 10 is a block diagram illustrating an example of a hardware configuration in an embodiment of the present invention. An information processing apparatus 1 can be implemented as a computer apparatus 4 including a processor 41, a main storage device 42, an auxiliary storage device 43, a network interface 44 and a device interface 45, which are connected via a bus 46. The storage 101 can be implemented by the main storage device 42 or the auxiliary storage device 43 and the other components can be implemented by the processor 41.

Although the computer apparatus 4 in FIG. 10 includes the respective components one by one, the computer apparatus 4 may include a plurality of same components. Also, in FIG. 10, the single computer apparatus 4 is illustrated; however, it is possible that software is installed on a plurality of computer apparatuses and the plurality of computer apparatuses perform different parts of processing in the software.

The processor 41 is an electronic circuit including a control device and an arithmetic device of the computer apparatus. The processor 41 performs arithmetic processing based on data and programs input from, e.g., respective devices in an internal configuration of the computer apparatus 4 and outputs arithmetic operation results or control signals to, e.g., the respective devices. Specifically, the processor 41 executes, e.g., an OS (operating system) of the computer apparatus 4 and applications to control the respective devices included in the computer apparatus 4. The processor 41 is not specifically limited as long as the processor 41 can perform the above processing.

The main storage device 42 is a storage device that stores, e.g., commands to be executed by the processor 41 and various data, and information stored in the main storage device 42 is directly read by the processor 41. The auxiliary storage device 43 is a storage device other than the main storage device 42. Each of these storage devices means an arbitrary electronic component capable of storing electronic information and may be a memory or storage. Also, the memory may be either a volatile memory or a non-volatile memory.

The network interface 44 is an interface for wireless or wired connection with a communication network 5. For the network interface 44, one that complies with an existing communication standard may be used. Information may be transmitted to and received from an external apparatus 6A communicably connected via the communication network 5, by the network interface 44.

The device interface 45 is an interface such as a USB that directly connects with an external apparatus 6B. The external apparatus 6B may be an external storage medium or a storage device such as a database.

Each of the external apparatuses 6A and 6B may be the above-described simulator 107 or may be an output apparatus or an input apparatus. The output apparatus may be, for example, a display apparatus that displays an image or an apparatus that outputs, e.g., sound. Examples of the output apparatus include, but are not limited to, an LCD (liquid crystal display), a CRT (cathode ray tube), a PDP (plasma display panel) and a speaker. The input apparatus includes devices such as a keyboard, a mouse and/or a touch panel and provides information input via these devices, to the computer apparatus 4. A signal from the input apparatus is output to the processor 41.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An information processing apparatus comprising:
   a processing circuitry configured to acquire data based on
     a data set including
       a plurality of first pairs each including both a set value and an evaluation value, the set value being a value set for a parameter of a system in operation or a product to be manufactured and the evaluation value being a value obtained by evaluating a result of testing the system or the product where the set value is set for the parameter, or
       a plurality of second pairs each including both the set value and an evaluation value variation obtained in a case where the set value is set for the parameter in the system or the product wherein the evaluation value variation indicates a variation of respective evaluation values obtained in a case where a plurality of values included within a neighborhood range of the set value are set for the parameter in the system or the product, the neighborhood range including a first range of values larger than or equal to the set value and a second range of values smaller than the set value;
   estimate a first relationship expression expressing a relationship between the set value and the evaluation value variation or estimate a second relationship expression expressing a relationship between the set value and the evaluation value and a third relationship expression expressing a relationship between the evaluation value and the evaluation value variation; and
   determine, based on the first relationship expression or a pair of the second relationship expression and the third relationship expression, a recommended set value which is a set value recommended to a user for the parameter in the system or the product;
   an output circuitry configured to output the recommended set value visibly to the user,
   wherein the processing circuitry further iterates processes until a termination condition is satisfied, the processes include acquiring an evaluation value by evaluating a result of testing the system or the product for which the recommended set value to the user is set to the parameter, updating the data set using the recommended set value and the acquired evaluation value, and estimating the first relationship equation or estimating the second relationship expression and the third relationship expression using the updated data set, and determining a recommended set value which is a set value recommended to the user, and
   when the termination condition is satisfied, the processing circuitry selects an optimum set value to be set for the system or the product from among a plurality of set values that have been set for the parameter of the system or the product so far, based on the evaluation value variation corresponding to each of the plurality of set values, wherein the selected optimum set value is set to the system or the product.

2. The information processing apparatus according to claim 1, wherein:
   the processing circuitry calculates a mean and a variance of a probability distribution of the first relationship expression; and
   the processing circuitry determines the recommended set value based on an acquisition function including the calculated mean and variance.

3. The information processing apparatus according to claim 2, wherein the processing circuitry determines a set value that maximizes or minimizes a value of the acquisition function that is based on the calculated mean and variance, as the recommended set value.

4. The information processing apparatus according to claim 1, wherein the optimum set value is the set value for which the evaluation value variation is minimized or the set value for which a predicted value of the evaluation value variation is smallest.

5. The information processing apparatus according to claim 1, wherein the processing circuitry determines a difference between maximum and minimum evaluation values of evaluation values for values within a neighborhood range for the recommended set value, as the evaluation value variation for the recommended set value.

6. The information processing apparatus according to claim 1, wherein:
   the processing circuitry further estimates a fourth relationship expression expressing a relationship between the set value and a worst evaluation value of the respective evaluation values obtained in a case where the plurality of values included within the neighborhood range of the set value are set for the parameter; and
   the processing circuitry determines the recommended set value based further on the fourth relationship expression.

7. The information processing apparatus according to claim 4, wherein the output circuitry outputs the optimum set value.

8. The information processing apparatus according to claim 7, wherein the output circuit outputs information including
   values within a neighborhood range of the optimum set value and
   a variation of evaluation values for the values.

9. The information processing apparatus according to claim 7, wherein the output circuit outputs information indicating at least one of a minimum value and a maximum value among evaluation values obtained for values within a neighborhood range of the set value regarded as optimum.

10. An information processing method comprising:
    providing a data set including
      a plurality of first pairs each including both a set value and an evaluation value, the set value being a value set for a parameter of a system in operation or a product to be manufactured and the evaluation value being a value obtained by evaluating a result of testing the system or the product where the set value is set for the parameter or
      a plurality of second pairs each including both the set value and an evaluation value variation obtained in a case where the set value is set for the parameter in the system or the product wherein the evaluation value variation indicates a variation of respective evaluation values obtained in a case where a plurality of values included within a neighborhood range of the set value are set for the parameter in the system or the product, the neighborhood range including a first range of values larger than or equal to the set value and a second range of values smaller than the set value;
    estimating a first relationship expression expressing a relationship between the set value and the evaluation value variation based on the data set, or estimate a second relationship expression expressing a relationship between the set value and the evaluation value and a third relationship expression expressing a relationship between the evaluation value and the evaluation value variation;

determining, based on the first relationship expression or a pair of the second relationship expression and the third relationship expression, a recommended set value which is a set value recommended to a user for the parameter in the system or the product; and outputting the recommended set value visibly to the user, the method further comprising iterating processes until a termination condition is satisfied, the processes including acquiring an evaluation value by evaluating a result of testing the system or the product for which the recommended set value to the user is set to the parameter, updating the data set using the recommended set value and the acquired evaluation value, and estimating the first relationship equation or estimating the second relationship expression and the third relationship expression using the updated data set, and determining a recommended set value which is a set value recommended to the user, and selecting, when the termination condition is satisfied, an optimum set value to be set for the system or the product from among a plurality of set values that have been set for the parameter of the system or the product so far, based on the evaluation value variation corresponding to each of the plurality of set values, wherein the selected optimum set value is set to the system or the product.

11. A non-transitory computer readable medium storing a program that causes a computer to perform a method comprising:

reading, from a memory, a data set including a plurality of first pairs each including both a set value and an evaluation value, the set value being a value set for a parameter of a system in operation or a product to be manufactured and the evaluation value being a value obtained by evaluating a result of testing the system or the product where the set value is set for the parameter or a plurality of second pairs each including both the set value and an evaluation value variation obtained in a case where the set value is set for the parameter in the system or the product wherein the evaluation value variation indicates a variation of respective evaluation values obtained in a case where a plurality of values included within a neighborhood range of the set value are set for the parameter in the system or the product, the neighborhood range including a first range of values larger than or equal to the set value and a second range of values smaller than the set value;

estimating a first relationship expression expressing a relationship between the set value and the evaluation value variation based on the data set, or estimate a second relationship expression expressing a relationship between the set value and the evaluation value and a third relationship expression expressing a relationship between the evaluation value and the evaluation value variation;

determining, based on the first relationship expression or a pair of the second relationship expression and the third relationship expression, a recommended set value which is a set value recommended to a user for the parameter in the system or the product; and outputting the recommended set value visibly to the user, the method further comprising iterating processes until a termination condition is satisfied, the processes including acquiring an evaluation value by evaluating a result of testing the system or the product for which the recommended set value to the user is set to the parameter, updating the data set using the recommended set value and the acquired evaluation value, and estimating the first relationship equation or estimating the second relationship expression and the third relationship expression using the updated data set, and determining a recommended set value which is a set value recommended to the user, and selecting, when the termination condition is satisfied, an optimum set value to be set for the system or the product from among a plurality of set values that have been set for the parameter of the system or the product so far, based on the evaluation value variation corresponding to each of the plurality of set values, wherein the selected optimum set value is set to the system or the product.

12. The information processing apparatus according to claim 1, wherein the termination condition is a condition based on a number of times the set value has been set to the parameter of the system or the product or an elapsed time.

\* \* \* \* \*